United States Patent [19]
Whitemore

[11] 3,802,254
[45] Apr. 9, 1974

[54] SHEAR MODULUS EXTENSOMETER

[75] Inventor: Christopher Whitemore, Riverside, Calif.

[73] Assignee: Rohr Industries, Inc., Chula Vista, Calif.

[22] Filed: Oct. 30, 1972

[21] Appl. No.: 302,272

[52] U.S. Cl. .................................................. 73/101
[51] Int. Cl. ............................................... G01n 3/24
[58] Field of Search ................. 73/15.6, 95, 99, 101

[56] References Cited
UNITED STATES PATENTS

| | | | |
|---|---|---|---|
| 2,375,209 | 5/1945 | Basquin | 73/101 |
| 3,295,365 | 1/1967 | Larrigan | 73/95 |
| 3,592,545 | 7/1971 | Paine | 73/95 |
| 3,174,333 | 3/1965 | Behre | 73/101 |
| 3,690,161 | 9/1972 | Jackson et al. | 73/101 |
| 3,183,707 | 5/1965 | Gurney et al. | 73/101 |

OTHER PUBLICATIONS
A.S.T.M. Designation C273–61 in A.S.T.M. Handbook No. 16, pg. 6–10, June 1965.

*Primary Examiner*—Herbert Goldstein

[57] ABSTRACT

An apparatus and method of accurately determining the shear modulus of a test specimen. The apparatus comprises of a main support frame including structure to clamp the apparatus to the specimen, a pair of juxtaposed indexing points, one fixed in position and one movable relative thereto in the plane of the line of shear and a differential transformer with a translatable core interconnected to the movable index point. For testing, the test specimen is firmly held by rigid brackets with the apparatus of the invention clamped thereto. Equal and opposite stress forces are applied to the opposite corners of each end of the specimen so as to provide a line of shear or boundary that lies between the index points. This relative movement is translated through transformer core movement to produce a transformer electrical output corresponding to the length of relative physical movement of the test specimen along the boundary.

10 Claims, 3 Drawing Figures

PATENTED APR 9 1974 3,802,254

SHEAR MODULUS EXTENSOMETER

BACKGROUND OF THE INVENTION

The invention relates to an improvement in materials testing equipment and, in particular but not by way of limitation, relates to an instrument and method for measuring the shear modulus of a test specimen.

In the past it has been known to measure shear modulus by attaching a test specimen by adhesive bonding between two rigid steel plates, applying compression or tension forces between the two rigid steel plates, and measuring the relative movement between the steel plates as the external force is applied. This movement is read by either a mechanical dial read-out means closely related to the test specimen and read directly by the operator or monitored by electrical transducer means and displayed on a digital indicator or recorded permanently on a strip chart recorder. This method is explained in detail in the 1970 Annual Book of Standards, Part 16, at page 9, referenced as STD C273 published by the American Society of Testing and Material.

It has been found that this method does not have the precision or accuracy required in testing materials used, for example, in modern high speed aircraft because the material movement measured is an average movement of the entire test specimen rather than the movement of the material isolated to the area of shear alone. The reading inaccuracy is further increased due to the method of holding and the size of the specimen vs the force applied. The over-all accuracy is further limited by the read-out instrument employed.

A more accurate means of determining shear modulus, considered by many as a laboratory method, utilizes a mirror device that is attached to the specimen so to reflect light from the light source to a remote scale. A zero reference is first established on the scale and as force is applied to opposite ends of the specimen causing the mirror to rotate causing the reflected light to be displaced from the first zero reference a distance on the scale proportional to the relative movement of the specimen. The scale reading is now related by geometric calculations to the actual movement of the test specimen. Although this method is considerably more accurate than the method hereinbefore described, the accuracy achieved is directly related to the precise distances between the mirror and light source, mirror placement with respect to the test specimen, distance between the mirror and scale, and accuracy of the geometric calculations. Although this is an accurate method for determining shear modulus, it is obvious that a considerable amount of operator time is required for each test set up and is, therefore, not practical for commercial applications.

Obviously an improved means for accurately measuring the shear of a specimen more accurately with reduced set up time, and the elimination of most operator calculations would be highly desirable.

SUMMARY OF THE INVENTION

In accordance with the present invention there is provided a novel apparatus for measuring the shear of a specimen.

In general, the invention contemplates an extensometer comprising a main body or frame carrying a differential transformer, a fixed and a movable indexing means spaced apart a predetermined distance, at a selected distance apart, the movable index means being arranged to move the core of the transformer, and a removable and adjustable spring loaded holding bar designed to engage a specimen to be tested and hold it in separative engagement with the indexing means. To perform a test, the test specimen is mounted between steel holding fixtures. The fixture allows force to be applied to the test specimen at one end to the top portion and at an opposing end to the bottom portion thereby causing relative movement of the test specimen through a boundary line at its vertical center. The indexing means are aligned at the center of the test specimen establishing a starting or zero reference point. Force is then applied to the specimen. The relative movement of the specimen across the shear boundary between the indexing means causes both indexing means to follow the movement of the portions of the specimen lying on either side of the boundary. The movable indexing means causes the intr-connected differential transformer core to move a distance corresponding to the degree of relative movement of the test specimen. The mechanical translation of the core is converted to electrical signals by transformer means well known in the art. This signal is representative of the actual length of over-all relative movement of the test specimen and is displayed on a digital read-out type meter or recorded on a suitable recording device.

There are several important advantages of this invention and among these are; measurement accuracies greater than ±0.00005 per inch, shorter test periods with respect to time, i. e. eliminating bonding test specimens to the holding means and elaborate and accurate set up as employed in mirror type testing method.

DETAILED DESCRIPTION OF THE PREFERRED EMBODIMENT

Figure 1:
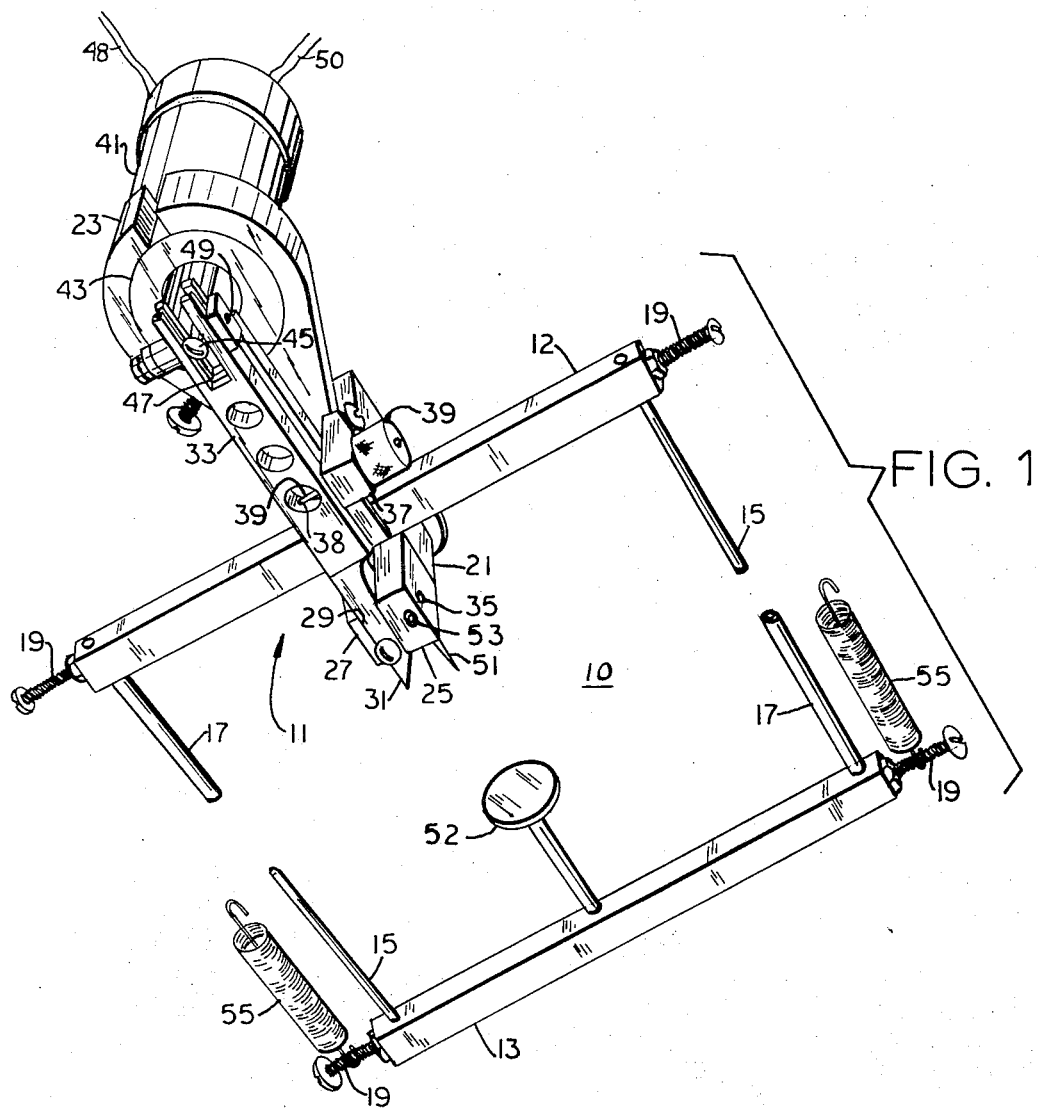
FIG. 1 is a perspective view of the extensometer device of the instant invention.

Referring now to the drawings in detail, and in particular FIG. 1, reference character 10 refers to a testing apparatus illustrating a preferred embodiment of the present invention. The extensometer 10 has a main body or frame 11 comprising a holding bar 12, male and female engaging pins 15 and 17 respectively, mounting anchors 19, a downwardly extending portion 21 for engagement with and snubbing of the specimen, a rearward extending "C" clamp portion 23, a forward upwardly extending portion comprising fixed scribe holding means 25 and upwardly extending guide wall portion 27 which are arranged to form an elongated channel 29 therebetween. Disposed within the channel 29 is movable indexing means 31 carried by a lever arm 33. Positioned within and transverse to the elongated channel 29 and secured to the lever arm 33 is a pivot pin 35. The elongated channel 29 has ball bearings, not shown, mounted in wall portions 25 and 27 disposed respectively on opposite sides of the channel for friction free movement of the pivot pin 35. With this arrangement, the lever arm 33 can fully swing or tilt about the axis of pin 35 within the channel 29. Alignment bracket 37, which is also a part of main frame 11, is provided with a bore 38 to receive alignment pin 39. A similar bore 38 is provided through lever arm 33 to provide precise relative alignment between the fixed and movable indexing means when alignment pin 39 is inserted therethrough. In this alignment, the tip of the indexing means both lie in the plane passing through the axis of pin 35.

Figure 2:
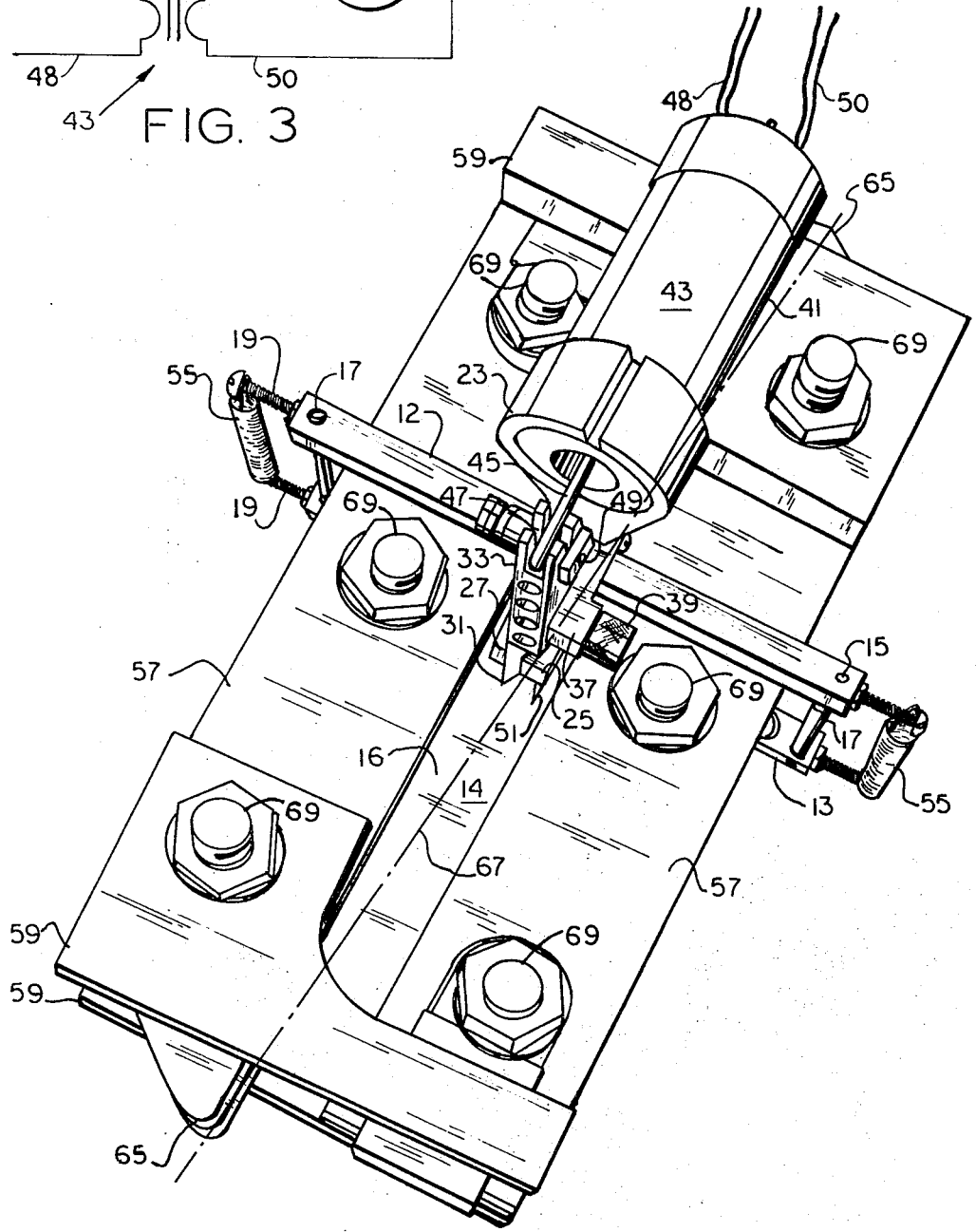
FIG. 2 is a perspective view of the extensometer device of the invention positioned on a test specimen.

Referring now to FIGS. 1 and 2, it will be noted that the bracket 23 receives the housing 41 of the transformer 43. The coils (not shown) of the transformer 43 are enclosed within the housing 41 together with the movable core element, not shown, the core element being secured to a connecting rod 45. The upper end of the connecting rod has a transverse bore, not shown, and extends into slot 47 of the lever arm and is operatively connected to the arm by a pivot pin 49.

The holder 25 for the fixed index means has an elongated opening, not shown, in which the fixed indexing means 51 is adjustably mounted; the same being fixed in adjusted position therein by a suitable locking means 53 such that the tips of the two indexing means 51 and 31 lie in a plane parallel to the axis of pivot pin 35.

The removable holding bar 13 carries male and female engaging pins 15 and 17 respectively for mating respectively with engaging pins 17 and 15 carried by fixed position holding bar 12. Bar 13 also has spring anchor pins 19, and specimen engaging and snubbing foot 52. Engagement pins 15 snugly nest within their corresponding engagement pins 17 when the movable holding bar 13 is assembled with fixed holding bar 12 for performing the desired test of the specimen.

As seen in FIG. 2, the movable holding bar 13 is biased toward holding bar 12 by springs 55 between anchors 19. Thus it will be apparent that the foregoing arrangement provides a means for securing the extensometer on the test specimen with the specimen disposed between the two holding bars 12 and 13 and with the foot 52 engaged with the test specimen to hold the same firmly against the tips of the indexing means 31 and 51.

Clearly the above described pivotal interconnections 35 and 49 enable the transformer core to very accurately follow the motion of the movable index means 31 and to provide for linearity of movement between the core and the movable index means.

Figure 3:
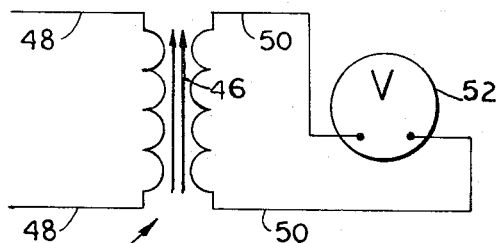
FIG. 3 is a schematic diagram of the electrical circuit of the differential transformer and the meter indicator.

REferring now to FIG. 3, the differential transformer 43 has a primary winding 48 connected to a suitable AC input voltage, not shown, and a secondary winding 50 having induced voltage through transformer action. The range of the secondary winding voltage is from zero to substantially the value of the primary voltage. The actual value is determined by the position of translatable core 46 of differential transformer 43 which is attached indirectly to movable index means 31. The voltage on the secondary windings 50 is connected to the input terminals of a suitable AC voltmeter. The meter read-out indicator converts the input from an AC voltage level to the actual physical distance of the relative movement of the specimen 14 between fixed index means 51 and movable index means 31.

In general, the extensometer device includes two juxtaposed indexing means comprising a fixed scribe point and the tip portion of a movable knife blade which operatively engage a test specimen 16 by slight penetration and be held firmly against the specimen by a spring tension between two holding bars 12 and 13 and foot 52 carried by the removable portion of the adjustable holding bar 13. The movable indexing means 31 is interconnected mechanically to the core of a differential transformer 43 which is also part of the extensometer. Transformer 43 has a primary winding 48 and a secondary winding 50. As a specimen is placed in tension between the index means follow the movement of the test specimen and this relative movement of the indexing means is imparted to the core 46 of the transformer 43 to produce an electrical signal at the transformer secondary windings usable either on a meter 52 or other suitable recording apparatus not shown to indicate the length of the relative movement of the specimen.

OPERATION OF THE PREFERRED EMBODIMENTS

The specimen 14 to be tested is placed between two pairs of oppositely disposed brackets 57 each having stress tabs 65. The center portion of the test specimen is exposed for testing as generally indicated by reference character 16. Each end of the combination of brackets 57 and test specimen 14 are placed between pairs of oppositely disposed brackets 59. Suitable fastening means such as bolts 69 pass through the holding brackets and the test specimen 10 preventing relative movement of the brackets and test specimen while under stress.

The extensometer 10 is positioned on the test specimen as hereinbefore described. It has been found that the most accurate measurement position is at the physical center of the exposed portion 16 of the test specimen 10 as shown by FIG. 2.

Equal and opposite stress force is applied between tabs 65 in a manner well known in the art. The stress force causes relative movement of the portions of the test specimen on either side of a boundary line 67 between the index means. This relative movement linearly translates the differential transformer core. This mechanical core translation causes the electrical output of the transformer to vary proportionally with the relative movement so as to produce an electrical output signal representative of relative movement of the specimen.

The invention may be embodied in other forms or carried out in other ways without departing from the spirit or essential characteristics thereof. The present embodiment of the invention is, therefore, to be considered as in all respects illustrative and not restrictive, the scope of the invention being indicated by the appended claims, and all changes which come within meaning and range of equivalency of the claims are intended to be embraced therein.

Having thus described the invention, what is claimed as new and useful and desired to secure by U. S. Letters Patent is:

1. A shear modulus extensometer comprising:
    means for defining two side by side reference points proximal to the center of a test specimen;
    means for applying a shear force to said test specimen along a plane passing between said reference points so that each of said reference points moves in a direction opposed to the other; and
    means for determining the distance of said movement.

2. The apparatus of claim 1 wherein said distance determining means is interconnected to one of said reference points for movement therewith.

3. The apparatus of claim 1 wherein said distance determining means includes an electrical signal producing element.

4. A shear modulus extensometer comprising:
a main support frame including a fixed holding means;
an adjustable holding means cooperating with said fixed holding means for support on a test specimen therebetween;
fixed and movable side by side indexing means carried by said main frame for engagement with said specimen proximal to the center thereof;
mounting means for said test specimen comprising opposing end portions having outer surfaces substantially parallel with a plane passing through the center of said index means said outer surfaces include stress tabs disposed at opposite sides of said plane for receiving and transferring external stress force to said test specimen along a plane between said index means thereby moving each of said index means in opposite directions; and
an electrical signal producing means carried by said main frame and operatively connected to said movable indexing means for producing an electrical signal corresponding to the length of movement of said test specimen between said index means.

5. The apparatus as defined in claim 4 wherein said fixed holding means and said adjustable holding means includes bias means therebetween for biasing said indexing means to said test specimen.

6. The apparatus as defined in claim 4 wherein said bias means comprises coil springs.

7. The apparatus as defined in claim 4 wherein said fixed indexing means comprises a sharp pointed scribe.

8. The apparatus as defined in claim 4 wherein said movable indexing means comprises the tip of a knife blade.

9. The apparatus as defined in claim 4 wherein said electrical signal producing means comprises a differential transformer having a translatable core.

10. A method of testing shear modulus of a test specimen comprising the steps of:
mounting the test specimen in a rigid holding fixture;

defining two reference points in close selected juxtaposed position at substantially the center most portion of the test specimen;
applying a stress force to the test specimen along a plane passing between said reference points so as to define a boundary of relative movement of the test specimen therebetween so that each of said reference points moves in a direction opposed to the other; and
measuring the relative movement of said reference points.

* * * * *